US007024815B1

(12) United States Patent
Visagie (10) Patent No.: US 7,024,815 B1
(45) Date of Patent: *Apr. 11, 2006

(54) LAMP PLUS-INSECT EXTERMINATOR

(76) Inventor: Gerhardus J. C. Visagie, 146 Station Road, Lyttelton Manor, Centurion, Gauteng Province (ZA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/847,750

(22) Filed: Apr. 22, 1997

(30) Foreign Application Priority Data

Apr. 22, 1996 (ZA) .............................................. 96/3163

(51) Int. Cl.
*A01M 1/04* (2006.01)

(52) U.S. Cl. .............................. 43/113; 43/107; 43/122
(58) Field of Classification Search .................... 43/107, 43/114, 113, 122, 139
See application file for complete search history.

(56) References Cited

U.S. PATENT DOCUMENTS

| 330,033 | A | * | 11/1885 | Manning | 43/113 |
| 841,531 | A | * | 1/1907 | Jones | 43/113 |
| 988,476 | A | * | 4/1911 | La Baum | 43/113 |
| 1,037,688 | A | * | 9/1912 | Troth | 43/113 |
| 1,231,877 | A | * | 7/1917 | Goodrum | 43/113 |
| 1,488,178 | A | * | 3/1924 | Thomas | 43/113 |
| 1,721,872 | A | * | 7/1929 | Patterson | 43/113 |
| 2,095,986 | A | * | 10/1937 | Koike | 43/113 |
| 3,465,468 | A | * | 9/1969 | Takomoto | 43/113 |
| 4,856,226 | A | * | 8/1989 | Taylor | 43/113 |
| 5,157,865 | A | * | 10/1992 | Chang | 43/113 |
| 5,274,949 | A | * | 1/1994 | Beaton | 43/113 |
| 5,301,456 | A | * | 4/1994 | Jobin | 43/113 |

* cited by examiner

Primary Examiner—Kurt Rowan (57) ABSTRACT

The invention provides a series of lamp-cum-insect exterminators in which guides serve to guide and/or deflect insects towards an extermination chamber. There is a primary light source within the guides which serves to attract insects towards the lamp and a secondary light source within the extermination chamber which serves to attract the insects down the guides into the chamber.

5 Claims, 3 Drawing Sheets

LAMP PLUS-INSECT EXTERMINATOR

INTRODUCTION TO THE INVENTION

This invention relates to a device for providing a primary source of light in combination with means for exterminating insects, particularly flying insects.

BACKGROUND TO THE INVENTION

Many species of insect are attracted at night to various kinds of artificial light and this can cause a great deal of inconvenience and discomfort to people in the vicinity, particularly in homes, on patios, at barbecues, whilst camping or fishing, or when working or walking outside with the aid of a lantern. In areas infected by malaria, artificial light sources tend to attract unwanted mosquitoes, thereby furthering the spread of the disease.

Methods most commonly used for preventing and/or dealing with unwanted concentrations of insects include the following:
a. fine gauze netting on doors and window screens;
b. mosquito nets over beds;
c. contact insecticides sprayed onto surfaces on which insects tend to settle;
d. space insecticides sprayed into the air in rooms;
e. vaporising strip insecticides which steadily pass off insecticidal vapours into the surrounding air;
f. sticky strips of material from which insects are unable to free themselves after having sed thereon; and
g. insect-exterminating lamps many of which emit ultraviolet light to attract insects, surrounded by electrified screens for intercepting, electrocuting and/or burning to death insects on their way to the light source.

All of the aforementioned methods of dealing with insects have inherent disadvantages as indicated below:
- the fine gauze netting on doors and window screens, as well as in mosquito nets, affects ventilation and cooling;
- insects tend to concentrate on the outside of doors and window screens fitted with fine gauze netting and if such doors or window screens have to be opened for any reason (such as for going out, coming in, opening a window, or dosing a window) insects are inclined to fly into the room, sometimes in large numbers, attracted by be light source(s) within;
- the spraying of insecticide within a room, whether this be onto surfaces or into the air, is bound to have cumulative detrimental effects on the health of the occupants, the degree to which this occurs depending largely on factors such as the type of insecticide used, the frequency of spraying, quantities sprayed, size of room, effectiveness of ventilation, number of occupants, sensitivity of occupants etc.;
- similarly, the continuous vaporisation of insecticide into a room, even at a comparatively slow rate, is bound to result in progressively worsening health, particularly of those occupant suffering from asthmatic or other pulmonary ailments;
- most insect-exterminating lamps presently on the market are not aesthetically pleasing;
- those using ultraviolet light to attract insects provide relatively poor and unpleasant illumination; and
- the process of electrocuting and/or roasting live insects, with the accompanying crackling noises, puffs of smoke and unpleasant smells is disturbing to most people and certainly not welcome in most homes.

An object of the invention is to provide an insect exterminator the use of which obviates at least some of the problems discussed above.

SUMMARY OF THE INVENTION

According to the invention a lamp-cum-insect exterminator comprises a plurality of guides spaced at least partially around a substantially centrally located duct which is substantially vertical in use; a top cover for the guides; an extermination chamber located substantially below the guides; and a primary light source associated with the guides.

Further according to the invention there is a secondary light source associated with the extermination chamber.

Still further according to the invention each of the guides comprises an open recessed member defining a space which decreases in width towards the duct and has at least one substantially downwardly sloping inclined surface remote from the extermination chamber.

Still further according to the invention the guides are operatively located such that their major portions are substantially above the extermination chamber and their lower portions within the extermination chamber.

The guides extend progressively outwardly from the extermination chamber.

Still further according to the invention the primary light source is located substantially within an area defined by the guides.

The primary light source may be located below the guides.

Still further according to the invention the primary light source is an electrically operated light source and may be powered by a battery system including a solar charging system.

Still further according to the invention the primary light source may be one of a flame and a flame heated mantle.

Still further according to the invention the primary light source may be one of a luminous and phosphorescent light source.

Still further according to the invention the secondary light source is located substantially within the extermination chamber.

Still further according to the invention the secondary light source may be an electrically operated light source or one of a luminous and phosphorescent light source or a reflective light source.

Still further according to the invention the reflective light source includes a reflective member for reflecting light from the primary light source.

Still further according to the invention there may be an insect attractant associated with the extermination chamber and the attractant includes at least one of a chemical, pheromonal and food bait attractant.

Still further according to the invention the guides may be at least one of a translucent and a transparent material able to transmit light from the primary light source or the guides may be at least one of an opaque and reflective material able to reflect light from the secondary light source.

Still further according to the invention the extermination chamber includes extermination means and the extermination means includes at least one of a surface sprayed insecticide, a container for a suitable insecticide, a heating device for heating a heat vaporisable insecticide and a mechanical exterminator.

Still further according to the invention at least of the primary and secondary light sources may comprise a plurality of right sources.

BRIEF DESCRIPTION OF THE DRAWINGS

Embodiments of the invention described by way of example only follow with reference to the accompanying drawings in which.

DETAILED DESCRIPTION WITH REFERENCE TO THE DRAWINGS

Figure 1:
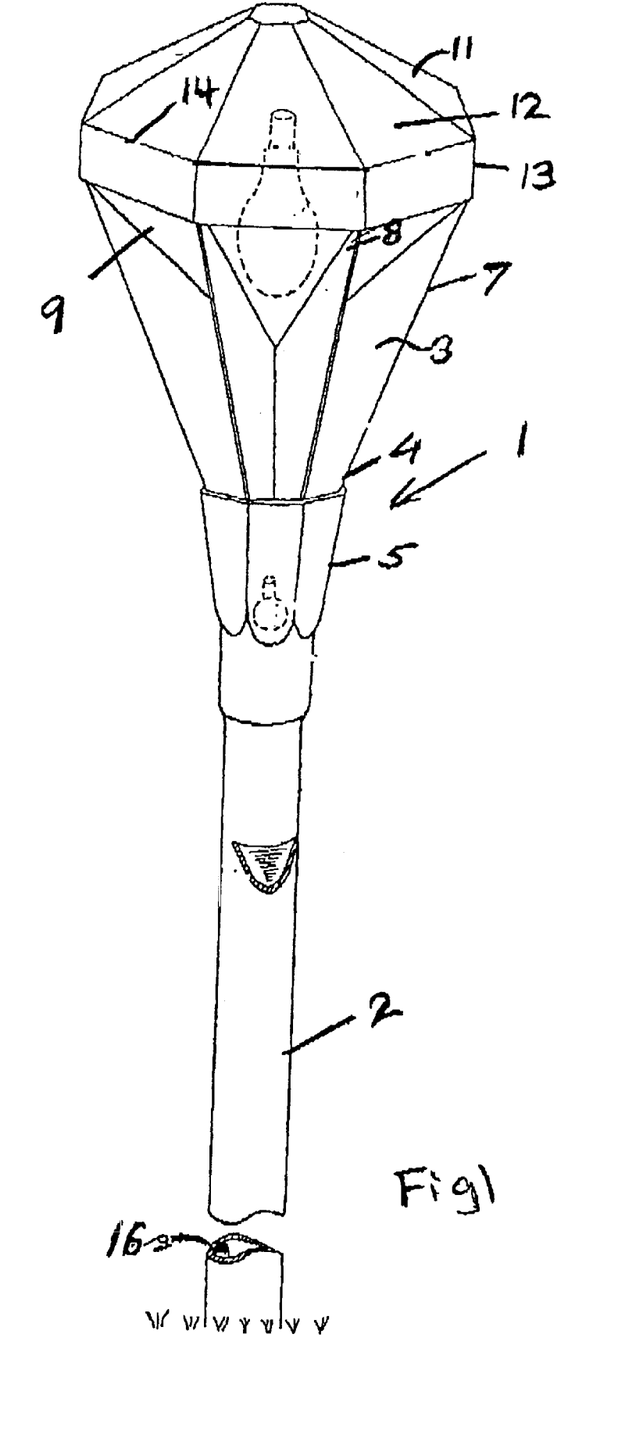
FIG. 1 is a side view of a first embodiment of a lamp-cum-insect exterminator.
Figure 2:
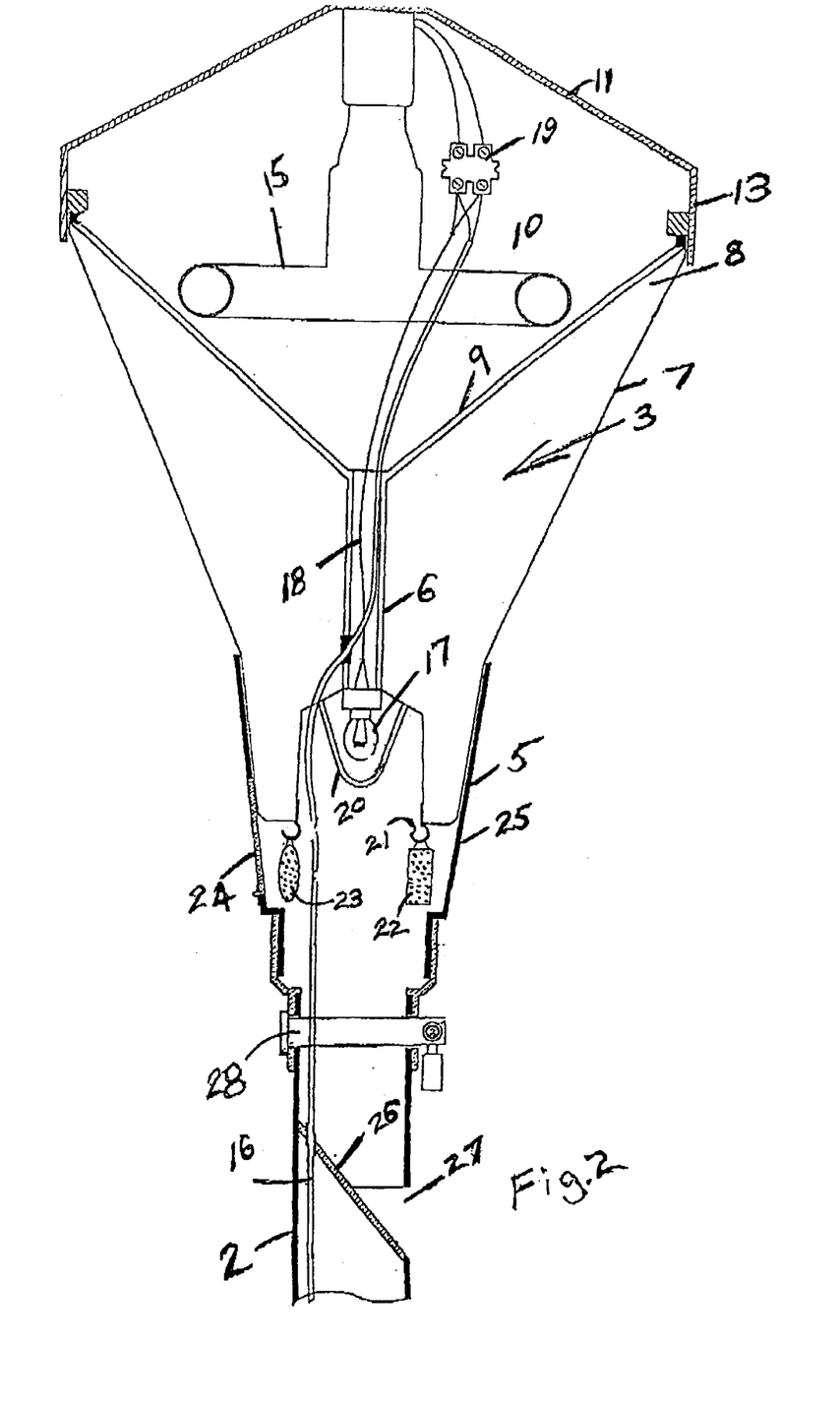
FIG. 2 is a sectional side elevation of the lamp-cum-insect exterminator of FIG. 1.

In the first embodiment of the invention as shown by FIGS. 1 and 2 an insect exterminator (1) which incorporates an outdoor light is provided. The exterminator and outside light combination is mounted on a tubular support member (2) to provide a lamp post which may be located in a garden for example.

The exterminator (1) comprises eight insect guides (3) which terminate at their lower ends (4) in an extermination chamber (5). The guides (3) are symmetrically located around a central duct (6) and comprise generally triangular shaped guide members (7) radiating from the central duct (6) and which provide the guide with a tapered shape, that is the guides decrease in width towards the extermination chamber (5). The guides are preferably made from a reflective material.

At their upper ends (8) the guides are closed off with triangular translucent members (9) which members form the lower portion of a primary light source housing (10). The upper portion of this housing (10) is provided by a top cover (11) which is opaque and which is removably located with respect to the guide members (7) themselves.

As may be seen from the figure the top cover is divided into eight portions (12) which correspond with the eight guides (3). The eight portions form a generally truncated pyramidal configuration with a side skirt (13) at the lower periphery (14).

Within the housing (10) is located a primary light source (15) which in this case is a circular noon tube but which may be an incandescent lamp for example. The electrical power for the light source is provided by a cable (16) which passes up the tubular support member (2) and through the central duct (6) into the housing (10).

At the bottom of the central duct (6) is a secondary light source (17) in the form of an incandescent lamp the power supply (18) for which emanates from a suitable connector block (19) in the housing (10) via the duct (6). Spaced from the bottom of the duct (6) and from the secondary light source (17) is an upwardly directed reflector (20) which is generally parabolically shaped and which serves to direct the light from the secondary light source (17) upwardly onto the surfaces of the guide members (7).

The secondary light source (17) and reflector (20) are located in the upper region of the extermination chamber (5) and serve to attract insects into that chamber.

Within the chamber are located hooks (21) on which a solid insecticide mat (22) and a solid attractant mat (23) may be hung. These insecticide mats are placed in position via a service door (24) in the side wall (25) of the extermination chamber (5).

The bottom of the extermination chamber is open and dead or dying insects are able to pass out of the bottom and are directed by means of a sloping guide (26) out of an aperture (27) in the side of the tubular support member (2).

As may be seen from FIG. 2 of the drawings the lamp cum exterminator combination is secured in place on the tubular support member (2) by means of a suitable locking pin (28) passing through co-axial holes in the lower portion of extermination chamber (5) and the tubular member (2).

Figure 3:
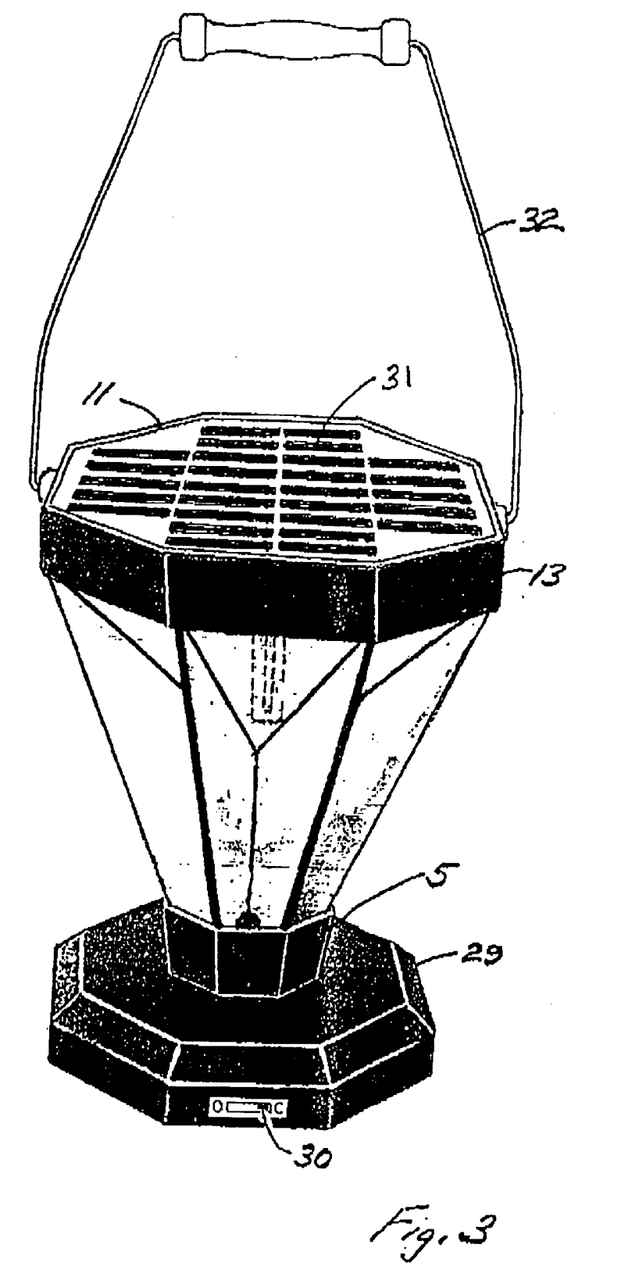
FIG. 3 is a side view of an alternative embodiment of a lamp-cum-insect exterminator.

A second embodiment of the invention is shown in FIG. 3.

This embodiment differs from the first embodiment in that it is a portable cum table model of the lamp and exterminator combination. Parts which are similar to those of the first embodiment are given similar reference numerals and are not described further herein.

The extermination chamber (5) forms part of an octagonal base (29) for the exterminator. This base incorporates a door (not shown) in the bottom thereof which is opened and closed by means of a control lever (30). Dead insects may be removed from the extermination chamber via the door.

The top section also incorporates a suitable battery or batteries (not shown) which are rechargeable either by plugging an incorporated charging unit (not shown) into a normal electrical supply via a plug and cable (not shown) or by an electrical current generated by solar cells (31) which form part of the top cover (11).

The exterminator/lamp combination is furthermore provided with a suitable handle (32) which is mounted to the side skirt (13) of the top cover (11).

In both of the embodiments described above the insect exterminator and light combinations serve the dual functions of providing light and of exterminating insects. The insects are attracted to the combination by the primary light source and attracted down the guides into the extermination chamber by the secondary light source. In the extermination chamber they are exterminated by the vapours of the insecticide therein.

In this connection it should be borne in mind that for purposes of this invention, flying insects can be divided into two classes, as follows:

a. the heavier, clumsier insects which have to fly fast in order to remain airborne and which, in general, when flying into a guide—
  i. are deflected downwards by the downwardly sloping surface with which they collide; and/or
  ii. fly into a space which becomes progressively narrower, eventually reaching a stage where they cannot open their wings fully and are consequently inclined to fall;
  in most of these cases falling directly into the extermination chamber below; and
b. the lighter, daintier insects which generally tend first to settle and walk around on the guide before being lured downwards towards the extermination chamber below by the secondary light source and/or optional attractants/bait placed within the extermination chamber.

In addition to the embodiments described above it should be noted that there are a number of important alternatives to the various components of the insect exterminator/light combination.

In the first place the primary light source could be an incandescent lamp or even a gas or liquid fuelled light source such as a kerosene burning wick or a suitable gas burning mantle. Also the secondary light source could for example simply be a reflector which reflects part of the light of the primary light source thereby creating the illusion of an independent secondary light source. Both light sources could be in the form of multiple light sources.

Secondly the exterminator may include various ways of providing an insecticide such as by the intermittent release of an aerosol or even a mechanical device such as a suction fan or even a rotating cutter which serves to chop up the insects moving into the extermination chamber.

Finally, it is envisaged that the insect exterminator/lamp could have any number of configurations and that such configurations could also depend on the use to which the combination is to be put.

What I/We claim as new and desire to secure by Letters Patent is:

1. A lamp-cum-insect exterminator comprising:

a plurality of substantially vertically extending guides having upper and lower ends, said plurality of guides being spaced at least partially around and extending from a central duct which is substantially vertical in use, said guides extending radially outwardly from said central duct, each of said guides defining a space which decreases in width towards said central duct and each of said guides having at least one substantially downwardly sloping inclined surface remote from its lower end;

a primary light source associated with said guides to attract insects to hit said guides;

an extermination chamber at the lower end of said guides; and a secondary light source below said primary light source and substantially within said extermination chamber, for directing light to attract insects to said extermination chamber.

2. A lamp-cum-insect exterminator as claimed in claim 1 in which said guides extend progressively outwardly and upwardly from said extermination chamber.

3. A lamp-cum-insect exterminator as claimed in claim 1 which said secondary light source is a reflective light source.

4. A lamp-cum-insect exterminator as claimed in claim 3 in which said reflective light source comprises a reflective member for reflecting light from said primary light source.

5. A lamp-cum-insect exterminator as claimed in claim 1 in which the extermination chamber includes exterminating means.

\* \* \* \* \*

UNITED STATES PATENT AND TRADEMARK OFFICE
CERTIFICATE OF CORRECTION

PATENT NO. : 7,024,815 B1
APPLICATION NO. : 08/847750
DATED : April 11, 2006
INVENTOR(S) : Gerhardus J. C. Visagie It is certified that error appears in the above-identified patent and that said Letters Patent is hereby corrected as shown below:

| ERRORS IN TITLE OF INVENTION AND SPECIFICATION AS PUBLISHED IN LETTERS PATENT dated April 11, 2006 | | | CORRECTIONS TO TITLE OF INVENTION AND SPECIFICATION |
|---|---|---|---|
| Column No. | Line No. | Errors in Title of Invention, Spelling, Wording and/or Typing | Correct Title of Invention, Spelling, Wording and/or Typing |
| n/a | (54) | LAMP PLUS-INSECT EXTERMINATOR | LAMP-PLUS-INSECT EXTERMINATOR |
| ABSTRACT | (57)+1 | lamp-cum-insect exterminators | lamp-plus-insect exterminators |
| 1 | 1 | LAMP PLUS-INSECT EXTERMINATOR | LAMP-PLUS-INSECT EXTERMINATOR |
| 1 | 29 | sed | settled |
| 1 | 43 | dosing | closing |
| 1 | 46 | be | the |
| 2 | 6 | lamp-cum-insect exterminator | lamp-plus-insect exterminator |
| 3 | 1 | at least of | at least one of |
| 3 | 10 | lamp-cum-insect exterminator | lamp-plus-insect exterminator |
| 3 | 11 | lamp-cum-insect exterminator | lamp-plus-insect exterminator |
| 3 | 15 | lamp-cum-insect exterminator | lamp-plus-insect exterminator |
| 3 | 46 | noon | neon |
| 4 | 5 | lamp cum exterminator combination | lamp-plus-exterminator combination |
| 4 | 13 | portable cum table model | portable-plus-table model |

UNITED STATES PATENT AND TRADEMARK OFFICE
CERTIFICATE OF CORRECTION

PATENT NO. : 7,024,815 B1  Page 2 of 4
APPLICATION NO. : 08/847750
DATED : April 11, 2006
INVENTOR(S) : Gerhardus J. C. Visagie It is certified that error appears in the above-identified patent and that said Letters Patent is hereby corrected as shown below:

| ERRONEOUS CLAIMS AS PUBLISHED IN LETTERS PATENT dated April 11, 2006 | | | CORRECT CLAIMS |
|---|---|---|---|
| Column No. | Line No. | Errors in Title of Invention, Wording and/or Typing, as well as Omissions from Text | |
| 5 | 14 | 1. A lamp-<u>cum</u>-insect exterminator comprising: | 1. A lamp-plus-insect exterminator comprising: |
| | | a plurality of substantially vertically extending guides having upper and lower ends, said plurality of guides being spaced at least partially around and extending from a central duct which is substantially vertical in use, said guides extending radially outwardly from said central duct, each of said guides defining a space which decreases in width towards said central duct and each of said guides having at least one substantially downwardly sloping inclined surface remote from its lower end; | a plurality of substantially vertically extending guides having upper and lower ends, said plurality of guides being spaced at least partially around and extending from a central duct which is substantially vertical in use, said guides extending radially outwardly from said central duct, each of said guides defining a space which decreases in width towards said central duct and each of said guides having at least one substantially downwardly sloping inclined surface remote from its lower end; |
| | | a primary light source associated with said guides to attract insects to hit said guides; | a primary light source associated with said guides to attract insects to hit said guides; |
| 6 | 4 | an extermination chamber at the lower end of said guides; <u>and</u> | an extermination chamber at the lower end of said guides; |
| 6<br>6<br>6 | 8<br>8<br>9 | a secondary light source below said primary light source and substantially within said extermination chamber, for directing light to attract insects ――――――――――― ――――――――― to said extermination chamber, ――― | a secondary light source below said primary light source and substantially within said extermination chamber, for directing light to attract insects sitting on said guides downwards towards said extermination chamber; and |
| 6 | 9/10 | ――――――――――――――――――― | a cover on the upper ends of said guides, |

UNITED STATES PATENT AND TRADEMARK OFFICE
CERTIFICATE OF CORRECTION

PATENT NO. : 7,024,815 B1
APPLICATION NO. : 08/847750
DATED : April 11, 2006
INVENTOR(S) : Gerhardus J. C. Visagie It is certified that error appears in the above-identified patent and that said Letters Patent is hereby corrected as shown below:

| ERRONEOUS CLAIMS AS PUBLISHED IN LETTERS PATENT dated April 11, 2006 | | | CORRECT CLAIMS |
|---|---|---|---|
| Column No. | Line No. | Errors in Title of Invention, Wording and/or Typing, as well as Omissions from Text | |
| 6 | 9/10 | 1. (continued) ———————————— | 1. (continued) said lamp-plus-insect exterminator being such that – insects cannot enter said central duct which accommodates lighting-related components; the open bottom end of each of said guides is located within said extermination chamber which closes off, on the outside only, a lower portion of each of said guides; and at least one of direct light and reflected light from said secondary light source is visible from within each of said guides. |
| 6 6 6 | 10 11 12 | 2. A lamp-cum-insect exterminator as claimed in claim 1 in which said guides extend progressively outwardly and upwardly, increasing in size as they rise above said extermination chamber. | 2. A lamp-plus-insect exterminator as claimed in claim 1 in which said guides extend progressively upwardly and outwardly, increasing in size as they rise above said extermination chamber. |
| 6 6 | 13 13/14 | 3. A lamp-cum-insect exterminator as claimed in claim 1 —— which said secondary light source is a reflective light source. | 3. A lamp-plus-insect exterminator as claimed in claim 1 in which said secondary light source is a reflective light source. |

UNITED STATES PATENT AND TRADEMARK OFFICE
CERTIFICATE OF CORRECTION

PATENT NO.         : 7,024,815 B1
APPLICATION NO. : 08/847750
DATED                 : April 11, 2006
INVENTOR(S)       : Gerhardus J. C. Visagie It is certified that error appears in the above-identified patent and that said Letters Patent is hereby corrected as shown below:

| ERRONEOUS CLAIMS PUBLISHED IN LETTERS PATENT dated April 11, 2006 | | | CORRECT CLAIMS |
|---|---|---|---|
| Column No. | Row No. | Errors in Title of Invention, Wording and/or Typing, as well as Omissions from Text | |
| 6 | 18 | 4. A lamp-cum-insect exterminator as claimed in claim 3 in which said reflective light source comprises a reflective member for reflecting light from said primary light source. | 4. A lamp-plus-insect exterminator as claimed in claim 3 in which said reflective light source comprises a reflective member for reflecting light from said primary light source. |
| 6 6 | 19 20 | 5. A lamp-cum-insect exterminator as claimed in claim 1 in which the extermination chamber includes exterminating means. | 5. A lamp-plus-insect exterminator as claimed in claim 1 in which said extermination chamber includes exterminating means. |

Signed and Sealed this

Sixteenth Day of January, 2007

JON W. DUDAS
*Director of the United States Patent and Trademark Office*

UNITED STATES PATENT AND TRADEMARK OFFICE
CERTIFICATE OF CORRECTION

PATENT NO.         : 7,024,815 B1
APPLICATION NO. : 08/847750
DATED                 : April 11, 2006
INVENTOR(S)       : Gerhardus J. C. Visagie It is certified that error appears in the above-identified patent and that said Letters Patent is hereby corrected as shown below:

| ERRORS IN TITLE OF INVENTION AND SPECIFICATION AS PUBLISHED IN LETTERS PATENT dated April 11, 2006 | | | CORRECTIONS TO TITLE OF INVENTION AND SPECIFICATION |
|---|---|---|---|
| Column No. | Line No. | Errors in Title of Invention, Spelling, Wording and/or Typing | Correct Title of Invention, Spelling, Wording and/or Typing |
| n/a | (54) | LAMP PLUS-INSECT EXTERMINATOR | LAMP-PLUS-INSECT EXTERMINATOR |
| ABSTRACT | (57)+1 | lamp-cum-insect exterminators | lamp-plus-insect exterminators |
| 1 | 1 | LAMP PLUS-INSECT EXTERMINATOR | LAMP-PLUS-INSECT EXTERMINATOR |
| 1 | 29 | sed | settled |
| 1 | 43 | dosing | closing |
| 1 | 46 | be | the |
| 2 | 6 | lamp-cum-insect exterminator | lamp-plus-insect exterminator |
| 3 | 1 | at least of | at least one of |
| 3 | 10 | lamp-cum-insect exterminator | lamp-plus-insect exterminator |
| 3 | 11 | lamp-cum-insect exterminator | lamp-plus-insect exterminator |
| 3 | 15 | lamp-cum-insect exterminator | lamp-plus-insect exterminator |
| 3 | 46 | noon | neon |
| 4 | 5 | lamp cum exterminator combination | lamp-plus-exterminator combination |
| 4 | 13 | portable cum table model | portable-plus-table model |

UNITED STATES PATENT AND TRADEMARK OFFICE
CERTIFICATE OF CORRECTION

PATENT NO. : 7,024,815 B1
APPLICATION NO. : 08/847750
DATED : April 11, 2006
INVENTOR(S) : Gerhardus J. C. Visagie It is certified that error appears in the above-identified patent and that said Letters Patent is hereby corrected as shown below:

| ERRONEOUS CLAIMS AS PUBLISHED IN LETTERS PATENT dated April 11, 2006 | | | CORRECT CLAIMS |
|---|---|---|---|
| Column No. | Line No. | Errors in Title of Invention, Wording and/or Typing, as well as Omissions from Text | |
| 5 | 14 | 1. A lamp-cum-Insect exterminator comprising: | 1. A lamp-plus-Insect exterminator comprising: |
| | | a plurality of substantially vertically extending guides having upper and lower ends, said plurality of guides being spaced at least partially around and extending from a central duct which is substantially vertical in use, said guides extending radially outwardly from said central duct, each of said guides defining a space which decreases in width towards said central duct and each of said guides having at least one substantially downwardly sloping inclined surface remote from its lower end; | a plurality of substantially vertically extending guides having upper and lower ends, said plurality of guides being spaced at least partially around and extending from a central duct which is substantially vertical in use, said guides extending radially outwardly from said central duct, each of said guides defining a space which decreases in width towards said central duct and each of said guides having at least one substantially downwardly sloping inclined surface remote from its lower end; |
| | | a primary light source associated with said guides to attract insects to hit said guides; | a primary light source associated with said guides to attract insects to hit said guides; |
| 6 | 4 | an extermination chamber at the lower end of said guides; and | an extermination chamber at the lower end of said guides; |
| 6 6 6 | 8 8 9 | a secondary light source below said primary light source and substantially within said extermination chamber, for directing light to attract insects._____________________ ______________________ to said extermination chamber, ____ | a secondary light source below said primary light source and substantially within said extermination chamber, for directing light to attract insects sitting on said guides downwards towards said extermination chamber; and |
| 6 | 9/10 | ............................................................ | a cover on the upper ends of said guides, |

UNITED STATES PATENT AND TRADEMARK OFFICE
CERTIFICATE OF CORRECTION

PATENT NO. : 7,024,815 B1
APPLICATION NO. : 08/847750
DATED : April 11, 2006
INVENTOR(S) : Gerhardus J. C. Visagie It is certified that error appears in the above-identified patent and that said Letters Patent is hereby corrected as shown below:

| ERRONEOUS CLAIMS AS PUBLISHED IN LETTERS PATENT dated April 11, 2006 | | | CORRECT CLAIMS |
|---|---|---|---|
| Column No. | Line No. | Errors in Title of Invention, Wording and/or Typing, as well as Omissions from Text | |
| 6 | 9/10 | 1. (continued) | 1. (continued) said lamp-plus-insect exterminator being such that – insects cannot enter said central duct which accommodates lighting-related components; the open bottom end of each of said guides is located within said extermination chamber which closes off, on the outside only, a lower portion of each of said guides; and at least one of direct light and reflected light from said secondary light source is visible from within each of said guides. |
| 6<br>6<br>6 | 10<br>11<br>12 | 2. A lamp-cum-insect exterminator as claimed in claim 1 in which said guides extend progressively outwardly and upwardly, increasing in size as they rise above said extermination chamber. | 2. A lamp-plus-insect exterminator as claimed in claim 1 in which said guides extend progressively upwardly and outwardly, increasing in size as they rise above said extermination chamber. |
| 6<br>6 | 13<br>13/14 | 3. A lamp-cum-insect exterminator as claimed in claim 1 ---- which said secondary light source is a reflective light source. | 3. A lamp-plus-insect exterminator as claimed in claim 1 in which said secondary light source is a reflective light source. |

UNITED STATES PATENT AND TRADEMARK OFFICE
CERTIFICATE OF CORRECTION

PATENT NO. : 7,024,815 B1
APPLICATION NO. : 08/847750
DATED : April 11, 2006
INVENTOR(S) : Gerhardus J. C. Visagie It is certified that error appears in the above-identified patent and that said Letters Patent is hereby corrected as shown below:

| ERRONEOUS CLAIMS PUBLISHED IN LETTERS PATENT dated April 11, 2006 | | | CORRECT CLAIMS |
|---|---|---|---|
| Column No. | Row No. | Errors in Title of Invention, Wording and/or Typing, as well as Omissions from Text | |
| 6 | 16 | 4. A lamp-cum-insect exterminator as claimed in claim 3 in which said reflective light source comprises a reflective member for reflecting light from said primary light source. | 4. A lamp-plus-insect exterminator as claimed in claim 3 in which said reflective light source comprises a reflective member for reflecting light from said primary light source. |
| 6 6 | 19 20 | 5. A lamp-cum-insect exterminator as claimed in claim 1 in which the extermination chamber includes exterminating means. | 5. A lamp-plus-insect exterminator as claimed in claim 1 in which said extermination chamber includes exterminating means. |

Signed and Sealed this

Thirtieth Day of January, 2007

JON W. DUDAS
*Director of the United States Patent and Trademark Office*